United States Patent
Pauls et al.

(10) Patent No.: US 6,552,097 B1
(45) Date of Patent: *Apr. 22, 2003

(54) PREPOLYMER COMPOSITIONS FOR INSULATING FOAMS

(75) Inventors: Mathias Pauls, Appenzell (CH); Rene Schumacher, Goldach (CH)

(73) Assignee: Rathor AG, Appenzell (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,493

(22) Filed: May 15, 2000

Related U.S. Application Data

(63) Continuation of application No. 09/058,901, filed on Apr. 9, 1998, now abandoned, which is a continuation of application No. 08/492,119, filed as application No. PCT/EP94/00384 on Feb. 10, 1994.

(30) Foreign Application Priority Data

Feb. 10, 1993 (DE) ............................................. 43 03 848
Feb. 10, 1993 (DE) ............................................. 43 03 849

(51) Int. Cl.$^7$ ............................................. C08G 18/62
(52) U.S. Cl. ........................ 521/114; 521/131; 521/132; 521/133; 521/152; 521/159; 528/75; 528/59; 528/905; 524/507; 524/590; 524/871; 524/873; 222/491
(58) Field of Search ................................. 521/114, 131, 521/132, 133, 152, 159; 528/75, 59, 905; 524/507, 590, 871, 873; 222/491

(56) References Cited

U.S. PATENT DOCUMENTS

| | | | | |
|---|---|---|---|---|
| 4,061,662 A | * | 12/1977 | Marans et al. | 560/26 |
| 4,263,412 A | * | 4/1981 | Pauls | 521/114 |
| 4,412,013 A | * | 10/1983 | Chang | 521/121 |
| 4,795,763 A | * | 1/1989 | Gluck et al. | 521/99 |
| 5,080,665 A | * | 1/1992 | Jarrett | |
| 6,054,499 A | * | 4/2000 | Pauls et al. | |

FOREIGN PATENT DOCUMENTS

| | | | |
|---|---|---|---|
| DE | 4025843 | * | 2/1992 |
| EP | 118171 | * | 9/1984 |
| EP | 462438 | * | 12/1991 |
| EP | 480342 | * | 4/1992 |
| EP | 546399 | * | 6/1993 |

* cited by examiner

*Primary Examiner*—Rachel Gorr
(74) *Attorney, Agent, or Firm*—Peters, Verny, Jones & Schmitt, L.L.P.; Howard M. Peters

(57) ABSTRACT

A prepolymer composition for producing polyurethane insulating foams from pressure tanks which consists of a prepolymer component with at least one PU prepolymer with a content of NCO groups of 4 to 20 wt % and usual additives, as well as a propellant component, wherein a polyisocyanate with a content of less than 2 wt %, based on the prepolymer component, of monomeric isocyanate is used.

21 Claims, No Drawings

PREPOLYMER COMPOSITIONS FOR INSULATING FOAMS

This application is a continuation of Ser. No. 09/058,901 filed Apr. 9, 1998, now abandoned; which is a continuation of Ser. No. 08/492,119, filed Oct. 16, 1995, abandoned, which is a 371 of PCT/EP94/00384 filed Feb. 10, 1994.

DESCRIPTION

This invention relates to a prepolymer composition for producing polyurethane insulating foams from a pressure tanks which consists of a prepolymer component with at least one PU prepolymer with a content of NCO groups of 4 to 20 wt % and usual additives as well as a propellant component. The invention furthermore relates to the use of polyisocyanate prepolymers based on hexamethylene-1,6-diisocyanates for producing prepolymer components for pressure-can polyurethane insulating foams, as well as to pressure cans with such a prepolymer composition and optionally a separate polyol component for producing polyurethane insulating foams.

The inventive prepolymer composition is used for producing polyurethane insulating foams which are used particularly for foaming in cavities. The main areas of application are the construction industry, but also technical products in which cavities must be filled to avoid condensation nests. When one-component polyurethane foams are spoken of, these are applied by discharging the prepolymer composition from pressure tanks, for example aerosol cans, on the spot with the help of propellants with a bulk density of 10 to 50 g/l, and processed. 1C foams are moisture-hardening, i.e. they can be cured solely with the help of the moisture contained in the air.

Two-component polyurethane foams require a second hydroxy component for curing the prepolymer composition, generally a polyol which must be added directly before foam formation. Curing can be accelerated by catalysts. Bulk densities in 2C foams are characteristically 10 to 100 g/l.

Transitional forms between 1C and 2C foams are possible. In this case a quantity of a hydroxyl component insufficient for reacting the isocyanate groups is added to the prepolymer before discharge. These transitional forms have come to be known as "1.5C foams". The invention also covers foaming agents with more than one separate reactive component.

Conventional prepolymer compositions for polyurethane insulating foams contain a prepolymer component having a minimum content of reactive NCO groups. The prepolymer itself is a polymer of suitable viscosity with terminal NCO groups. The composition contains a certain quantity of monomeric isocyanate. Suitable isocyanates are for example isophorone di-isocyanate, referred to as IPDI, tolylene diisocyanate, also referred to as TDI, diisocyanatotoluene, 1,5-diisocyanatonaphthalene, referred to as NDI, triisocyanatotrimethylmethane, 1,6-diisocyanatohexane, referred to as HDI, or 4,4-diisocyanatodiphenylmethane in a raw and pure form or as a mixture. An especially common one is 4,4-diisocyanatodiphenylmethane, also referred to as MDI, which is used both in a raw form (raw MDI) and in the form of pure 2,4- and 4,4-isomers or mixtures thereof. One can likewise use the two common TDI isomers alone or in a mixture. For producing the prepolymer component one reacts such isocyanates with hydroxy polyethers, polyesters or polyvalent alcohols, making sure the prepolymer acquires a viscosity suitable for the composition.

As mentioned above, PU prepolymers suitable for producing polyurethane insulating foams from pressure tanks contain a residual content of unreacted monomeric isocyanate which can be up to 40%. This residual content is usually due to manufacturing, but is also desirable since it has turned out that this residual content has a positive effect on the serviceability, in particular the inherent and dimensional stability, of the produced foams. On the other hand monomeric isocyanates are deemed dangerous substances subject to identification because of their toxicity, despite their generally rather low volatility. MDI, the preferred initial isocyanate for 1C foams, is subject to a maximum working place concentration of 0.01 ppm, as is HDI. Because of the toxicity of the contained substances packings having residues of these prepolymers are subject to cost-intensive restrictions on disposal.

Although it is possible to produce prepolymers with low residual monomer contents, the low serviceability of the produced foams has prevented the use of such prepolymer compositions up to now. No applicable polymer compositions for pressure cans have become known. It was generally assumed that monomer-free standardizations cannot be used in pressure cans. Monomer-free prepolymers can be produced for example by removal of the monomer through distillation and optionally further reaction with a reactive hydroxy polyether and/or polyester and/or vegetable oil, modified or unmodified.

EP-A-0 420 026 describes a method for producing low-monomer polyurethane prepolymer based on tolylene diisocynate. DE-A40 25 843 and EP-A-0 480 342 describe prepolymer compositions for producing polyurethane isulating foams from pressure tanks which consist of a prepolymer component with at least one PU prepolymer with free NCO groups and usual additives as well as a propellant component. Low-monomer pre-polymer components are accordingly not used.

In view of the disadvantages of known PU prepolymers containing monomeric isocyanate it is desirable to provide a PU prepolymer containing little or substantially no more monomeric isocyanate while guaranteeing the properties demanded particularly by the construction industry, e.g. dimensional stability of the foam. It is in particular the goal of the invention to provide a prepolymer composition for dimensionally stable 1.5C PU foams which contains toxic and/or irritant components in quantities so low that they are no longer subject to identification.

The following are the sources or trademarks for the indicated materials:

CASTOR OIL, a natural product,

LEVEGARD PP, a trademark for softener, a product of Bayer AG, Leverhusen, Germany, IXOL M 125, a trademark for flameproofing agent, a product of Solvay, located at Brussels, Belgium, TEGOSTAB B 1048, a trademark for a stabilizer, a product of Goldschmid AG, Essen, Germany, TEXACAT DMDEE, a trademark for 2,2-dimorpholinodiethylether, a product of Texaco, Inc., White Plains, N.Y., THANCAT DMP, a trademark for dimethyl piperazine, a product of Condea GmbH, Hamburg, Germany, DESMODUR N 3400, a trademark for an aliphatic polyisocyanate based on HDI with 20% NCO, a product of Bayer AG, Leverhusen, Germany, DESMODUR N, a trademark for a polyisocyanate with 22% NCO, a product of Bayer AG, DESMODUR L, a trademark for a polyisocyanate with 13% NCO, a product of Bayer AG, DESMODUR Z 4370, a trademark for a polyisocyanate, a product of Bayer AG, DESMODUR E 326S, a trademark for a polyisocyanate, a product of Bayer AG, DESMODUR N 75, a trademark for a polyisocyanate with 16.4% NCO, a product of Bayer AG, DESMODUR L 75, a trademark for a polyisocyanate with 13% NCO, a product of Bayer AG, DESMODUR DA, a trademark for a polyisocyanate, a product of Bayer AG, DESMODUR N 3390, a trademark for a polyisocyanate, a product of Bayer, AG, R 134a, 1,1,2-tetrafluoroethane, a common abbreviation of a propellant, R 152a, 1,1-difluoroethane, a common abbreviation of a propellant, R 125, pentafluoroethane, a common abbreviation of a propellant, R 143, 1,1,2-trifluoroethane, a common abbreviation of a propellant, TEGOIMR 830, a trademark for a 10% emulsion of a liquid polybutadiene with a moleular weight of about 3000 and with a surface active agent, a product of Goldschmid, located at Essen, Germany, BYK 160, a trademark for wetting additive, a product of BYK Chemie GmbH, Wesel, Germany, BYK 051, a trademark for wetting additive, a product of BYK Chemie GmbH, Wesel, Germany, BYK 052, a trademark for wetting additive, a product of BYK Chemie GmbH, Wesel, Germany, BYK 053, a trademark for wetting additive, a product of BYK Chemie GmbH, Wesel, Germany, Aerosil 200, a trademark for thixotroping agent, a product of Degussa AG, Frankfurt, Germany, Finntalc M-15, a trademark for talcum, a product of Finnminerals Oy, Espoo, Finland, Ultracarb U-5, a trademark for calcium carbonate, a product of Microfine Minerals and Chemicals Ltd., Derby, UK, POLYOL 130, a trademark for a liquid polybutadiene a product of Hüls AG, Marl, Germany, DABCO, a trademark for a crystalline catalyst 1,4-Diazabicyclo[2.2.2]octane a product of Air Products and Chemicals, Inc., Allentown, Pa., DIN 4102 is a German Industrial Standard, PHOSFLEX 362, a trademark for a flame retardant a product of Akzo NV, Arnhem, Netherlands, FYROFLEX, a trademark for a flame retardant a product of Akzo NV, Arnhem, Netherlands.

In addition there is a need for additives promoting the dimensional stability of insulating foams to be used for monomer-containing as well as low-monomer and monomer-free prepolymers.

The invention provides a prepolymer composition of the abovementioned type which is based on the use of a polyisocyanate with a content of less than 2 wt %, based on the prepolymer component, of monomeric isocyanate. This surprisingly achieves applicable mixtures.

For producing the inventively applied prepolymer composition one uses conventional aliphatic and aromatic polyisocyanates. In particular one uses polyfunctional isocyanates with a mean of 2 to 4 isocyanate groups, both in monomeric and in oligomeric form. As stated at the outset, these pre-polymer compositions are themselves reaction products from monomers or oligomers containing isocyanate groups, and components reactive therewith, in particular hydroxyfunctional compounds. Suitable initial isocyanates are mentioned for example in DE-A-42 15 467.

Especially suitable isocyanate prepolymers for these prepolymer compositions are ones based on HDI, dimeric or trimeric TDI, NDI, 4,4'-dicyclohexylmethanediisocyanate and IPDI, which can be converted especially easily to substantially monomer-free prepolymers. It is also especially suitable to use polyisocyanates containing biuret groups (Desmodur N with 22% NCO content, optionally after lowering the NCO content by dilution) and addition polymers of TDI with polyols, in particular trimethylolpropane (Desmodur L with 13% NCO) which are set to be substantially monomer-free. Further suitable types of isocyanate are the commercial products Desmodur Z 4370 and E 326S.

The NCO content in the applied prepolymer is between 4 and 20 wt %, preferably between 6 and 18 wt % and in particular between 7 and 13 wt %.

When producing the isocyanate prepolymers one uses usual hydroxy components, for example polyether, polyester or modified vegetable oils with a sufficient hydroxyl number, approximately in the range of 100 to 300. Castor oil with a hydroxyl number of about 160 is suitable, as are usual glycols, in particular polyethylene glycols.

The monomer-reduced prepolymer itself is obtainable for example by removing the monomer in a thin-layer evaporator. Alternatively or additionally one can react (residual) isocyanate monomer with a hydroxy polyether and/or polyester and/or modified vegetable oil. Suitable vegetable oils are ones with a hydroxyl number of 100 to 300, for example castor oil with a hydroxyl number of about 160. According to the invention it is readily possible to obtain stable foams with such monomer-reduced prepolymer components, provided the polybutadiene is added. A prepolymer composition is termed low-monomer if it has less than 10% monomer, in particular less than 5% monomer; and substantially monomer-free if it has less than 2, preferably less than 1 and in particular less than 0.5 wt % monomer, always based on the prepolymer component, i.e. the reactive isocyanate-containing component present in the composition.

Suitable initial prepolymers for inventive foams, in particular 1.5C foams, have proved to be ones based on HDI, as offered for example by Bayer under the designations Desmodur DA and N 3400, as well as Desmodur N 3200 and N 3390. These have a residual content of monomeric HDI of less than 0.5 wt %. Desmodur N is a dimeric HDI. These materials have not been applied in foam production up to now.

The prepolymner can contain usual additives, for example polysiloxanes for controlling cell opening, flameproofing agents, softeners, catalysts, viscosity regulators such as propylene carbonate, triethyl phosphate and diphenylcresyl phosphate in quantities up to 40 wt %, based on the polymer component, dyes, rheology-controlling additives and the like. The prepolymer composition, i.e. the PU prepolymer including all additives without propellants, expediently has an initial service viscosity at 20° C. of 5000 to 20000 mPa.s and preferably of 8000 to 15000 mPa.s. According to the invention the content of NCO groups in the PU prepolymer is 4 to 20 wt %, preferably 6 to 18 wt % and in particular 7 to 13 wt %, based on the prepolymer.

Alternatively or additionally a tendency of linear foam systems to shrink can be counteracted by adding so-called cell openers. These are particularly paraffin oils with a density of 0.81 to 0.9 g/ml and a viscosity of 20 to 300 mPa.s/20° C. or silicone-free polymers based on polyvinyl alkyl ether with a foam-inhibiting effect, as are applied by BYK-Chemie GmbH under the designations BYK-051, -052 and -053 for lacquer systems. These additives are added in quantities of 0.01 to 2, preferably 0.1 to 1 wt %, based on the prepolymer component. It has surprisingly turned out that defoaming additives can actually counteract the tendency of polyurethane building foams to shrink.

Alternatively or additionally one can achieve a mechanical stabilization effect by incorporated mineral solids, for example by talcums, calcium carbonates, etc. In this case it is advantageous to use surface-active wetting additives to prevent signs of sedimentation. In combination therewith one can also use rheology-promoting additives, for example hydrophilic, colloidal silicic acid, as is available under the designation Aerosil.

The addition of a low quantity of polybutadiene makes it possible to increase the dimensional behavior of low-monomer and monomer-free PU prepolymers and obtain a fully foamable, dimensionally stable insulating material. Polybutadiene can be used in combination with PU prepolymers from all usual isocyanates, but is especially advantageous in combination with PU prepolymers based on HDI and MDI.

Suitable polybutadienes to be used are particularly liquid products as are offered by Hulls AG with a viscosity of at least 500 mPa.s at 20° C. Viscosity is preferably at least 2000 mPa.s at 20° C. and in particular about 3000 mPa.s at 20° C. An especially suitable liquid polybutadiene is sold under the designation Polyol 130 with about 75% 1,4-cis double bonds, about 24% 1,4-trans double bonds and about 1% vinyl double bonds and a molecular weight (vapor-pressure osmotic) of about 3000. The content of liquid polybutadiene according to the invention is 0.01 to 2 wt % and preferably 0.05 to 1 wt %, based on the prepolymer component to which it is added.

Suitable polybutadienes are furthermore those products of higher molecular weight which can be added to the prepolymer composition in a dissolved form or be dissolved therein. Also one can use higher-molecular polymeric hydrocarbons containing double bonds.

The molecular weight of suitable stabilizing additives is expediently 1000 to 9000, in particular up to 5000.

Along with pure (liquid) polybutadiene one can also use copolymers of 1,3-butadiene with other 1,3-dienes, for example isoprene, 2,3-dimethylbutadiene and piperylene, and with vinylaromatic compounds such as styrene, α-methylstyrene, vinyl toluene and divinylbenzene. The content of comonomers in the copolymers should not exceed 50 mol %. Such copolymers are regarded as falling within the designation "(liquid) polybutadiene" if they are liquid or soluble.

It is assumed that the dimensionally stabilizing effect of polybutadiene is based on its ability to crosslink in the presence of oxygen.

The inventive prepolymer composition contains in particular propane, butane and/or dimethylether as a propellant component. Further propellants that can be used in the component are flurocarbons which are liquefiable under the pressure conditions prevailing in a pressure tank, for example R 125, R 134a, R 143 and R 152a. To minimize the content of combustible and halogen-containing propellants one can add further gases which are not condensable under the pressure conditions prevailing in the pressure can, for example $CO_2$, $N_2O$ or $N_2$—$CO_2$ is particularly preferred since it can partly dissolve in the prepolymer component and thereby contribute to foam formation, while also acting as a good propellant.

The propellant component of the prepolymer composition expediently constitutes 5 to 40 wt %. The $CO_2$ content in the propellant can be for example about 5 wt %, based on the total propellant component. The content of gases not condensable under the prevailing pressure conditions should be such that the volume based on the empty space in the pressure tank yields a pressure of about 8 to 10 bars, depending on the relevant national specification for pressure tanks (aerosol cans). The empty space in the pressure tank is the space assumed by the uncondensed components of the prepolymer composition.

The liquid butadiene is expediently added to the prepolymer composition in solution along with an emulsifier—for example in a weight ratio of 80/20, preferably in solution with a hydroxy vegetable oil suitable for controlling the isocyanate content of the PU prepolymer. It has proven especially suitable to use castor oil with a hydroxyl number of 160, but any other hydroxy vegetable oils and hydroxy polyethers and polyesters can also be used. These are hydroxy components as are conventionally used for modifying viscosity in the formulation of prepolymer compositions. The other dimensionally stabilizing additives can be added accordingly.

The inventive prepolymer compositions can be used above all as 1.5C, but also as 1C and 2C polyurethane foams. With 1.5C and 2C foams the polyol component required for curing the foam is kept separate from the prepolymer composition in known fashion and added only directly before or during discharge. The corresponding methods are widely described and known to the expert, as are suitable two-component pressure cans with a separate tank for the second component.

The second component can be in particular usual polyols, in particular glycol, glycerine and butanediol. To accelerate the curing reaction it may be expedient to add to this second component a usual catalyst, for example tin dioctoate, cobalt naphthenate and octoate, dibutyl tin dilaurate, metallic, in particular ferrous, acetonylacetate, DABCO crystalline and Nmethyl-2-azanorbornane. Further catalysts are triethylenediamine, trimethylaminoethylpiperazine, pentamethyldiethylenetriamine, tetramethyliminobis-propylamine, bis(dimethylaminopropyl)-N-isopropanolamine. It is also suitable to use heteroaromatic amines, as stated for example in DE-A-42 15 647.

The invention relates further to the use of polyisocyanate prepolymers based on hexamethylene-1,6-diisocyanates and its oligomerization products for producing prepolymer components for polyurethane insulating foams, in particular 1.5C foams, these HDI prepolymers being used alone or in combination with suitable other polyisocyanates, preferably ones based on biuret and TDI.

The inventive prepolymer compositions are suitable for insulating purposes. They have also proved particularly suitable for producing spray adhesives, i.e. adhesives based on polyurethane which can be sprayed from aerosol cans with the aid of air as an additional atomizing medium. These adhesives can be used advantageously for gluing insulating mats, also based on polyurethane, to each other and to a base.

The invention relates finally to the use of liquid polybutadiene, paraffins and defoamers, as defined above, as an additive to isocyanate prepolymer compositions for polyurethane insulating foams for controlling cell opening and dimensional stability. The invention also relates to pressure cans for discharging polyurethane insulating foams with a prepolymer composition and optionally a separate polyol component, as described above.

Apart from the above-mentioned dimensional stability of the inventive prepolymer composition produced with the addition of liquid polybutadiene, the composition has the further advantage that it can be produced substantially free from chlorine and bromine and set to be fire-retardant without a need to add the usual halogen-containing flameproofing agents. This means that the addition of flameproofing agents for B2 foams according to DIN 4102 can be largely or fully dispensed with. This is the case in particular if the composition contains phosphorus-containing thinners or softeners (viscosity regulators), for example triethyl phosphate. A corresponding effect occurs with nitrogenous additives and vegetable oils, e.g. castor oil. If necessary, the prepolymer compositions can also be set to be substantially halogenfree, i.e. one can dispense not only with halogen-containing flameproofing agents but also with fluorocarbons as propellants. In this case it is sufficient for the propellant component to contain propane, butane, dimethylether and/or $CO_2$.

It has turned out that these flame-retardant properties are due in particular to the trialkyl and triaryl phosphates and phosphonates. One can mention diphenylcresyl phosphate, triphenyl phosphate, triethyl phosphate, dimethylmethane phosphonate and the like. One can further mention 2-ethylhexyldiphenylphosphate and phosphoric acid-1,3-phenylenetetra-phenylester, which are commercially available under the designations Phosflex 362 and Fyroflex RDP. Such phosphates and phosphonates can be present in the prepolymer composition in a quantity of 5 to 40 wt %, based on the prepolymer component. They have the advantage that they do not disturb the balance of prepolymer, propellant and thinners in the prepolymer composition but rather stabilize it, while conventional halogen-containing flameproofing agents interfere with this balance and can only be present with about 12 to 14 wt %.

The inventive prepolymer composition is produced in the fashion known in the art, whereby if low-monomer prepolymer is used it is put in the pressure tank as such or arises therein. One then adds to the prepolymer the liquid polybutadiene, e.g. mixed with a surface-active agent and emulsified in a hydroxy oil, for example castor oil. The hydroxy oil or castor oil simultaneously serves to finely adjust the NCO content of the prepolymer and lower the monomer content. Then the additives, such as flameproofing agents, stabilizers, softeners, catalysts, etc., are added, whereupon the pressure tank (aerosol can) is sealed and the propellant impressed.

The invention will be explained by the following examples.

EXAMPLES 1 TO 5

Desmodur N 3400, an aliphatic polyisocyanate based on HDI with about 20 wt % NCO, is mixed in a protective atmosphere with a polyol component. This polyol component consists of a polyesterol with a hydroxyl number of 239 (Ixol M 125 from Solvay) which simultaneously has flame-retardant properties, a softener (trismonochlorisopropylphosphate, TMCP), a usual stabilizer (Tegostab B 1048) and catalysts (Texacat DMDEE, 2,2-dimorpholinodiethylether; Thancat DMP, dimethyl piperazine). The temperature is carefully controlled during addition.

The crosslinking agent used consists of monoethylene glycol to which an inductor (catalyst) is added.

With constant stirring the desired quantity of the above-described mixture is put in a moisture-free pressure tank which is sealed with a dome provided with a valve, with introduction of a cartridge having the second component (crosslinker). After sealing, a corresponding quantity of propellant is impressed. The individual components of the propellant mixture are expediently impressed successively and optionally filled up again in a second pass. An especially suitable mixture is of dimethylether in combination with one or more fluorocarbons (R 152a and R 134a).

In the following monomer-free prepolymer compositions and filling proportions for a pressure tank with a filling ratio of 75% are stated. The mixtures yield a dimensionally stable foam with good insulating properties. The content of residual monomer of the composition is under 0.5 wt %. The foam can also be used in particular as a spray adhesive.

| Component | Parts by weight |
|---|---|
| Castor oil | 370 |
| Softener (Levagard PP) | 420 |
| Flameproofing agent (Ixol M 125) | 170 |
| Stabilizer (Tegostab B 1048) | 30 |
| Texacat DMDEE | 5 |
| Thancat DMP | 5 |
| | |
| Polyol component 1 | 1000 |
| Polyol component 1 | 142 g |
| Desmodur N 3400 | 181 g |
| Propellant R 134a | 30 g |
| R 152a | 60 g |
| Dimethylether DME | 10 g |
| Crosslinker: Monoethylene glycol | 12 g |
| Catalyst | 5 g |
| | |
| Total | 440 g |
| Gas fraction (wt %) | 23% |

EXAMPLES 2 AND 3

Inventive prepolymer compositions using conventional initial isocyanates were produced by the following recipes analogously to Example 1. The compositions yield an insulating foam with good dimensional stability and good insulating properties. The content of residual monomer in the compositions is clearly under 0.5 wt %.

Desmophen N 75 designates a polyisocyanate with an NCO content of 16.4 wt %, and Desmodur L 75 a polyisocyanate with an NCO content of 13 wt %. The former is a polyisocyanate containing biuret groups in 75% solution, the latter an addition polymer from TDI and TMP in 75% solution. Tego IMR 830 designates a 10% emulsion of a liquid polybutadiene with a molecular weight of about 3000 with a surface-active agent as an emulsifier (weight ratio 80/20; available from Goldschmidt) in castor oil with a hydroxyl number of 160.

| | Parts by weight | |
|---|---|---|
| Component | Example 2 | Example 3 |
| Castor oil | 320 | 320 |
| Softener | 420 | 420 |
| Flameproofing agent (Ixol m 125) | 170 | 170 |
| Tego IMR 830 10% | 50 | 50 |
| Tegostab B 1048 (Stabilizer) | 30 | 30 |

-continued

| Component | Parts by weight | |
|---|---|---|
| | Example 2 | Example 3 |
| Catalysts | | |
| Texacat DMDEE | 5 | 5 |
| Thancat DMP | 5 | 5 |
| Polyol component ⅔ | 1000 | 1000 |
| Polyol component ⅔ | 120 g | 120 g |
| Desmodur N 3400 | 150 g | 150 g |
| Desmodur N 75 | 50 g | |
| Desmodur L 75 | | 50 g |
| Propellant R 134a | 30 g | 30 g |
| R 152a | 60 g | 60 g |
| DME | 10 g | 10 g |
| Crosslinker: Ethylene glycol | 12 g | 12 g |
| Catalyst | 5 g | 5 g |
| Total | 437 g | 437 g |
| Gas fraction (wt %) | 23 | 23 |

EXAMPLES 4

An inventive prepolymer composition was produced by the following recipe analogously to Example 1. The composition yields an insulating foam with good dimensional stability and good insulating properties. The content of residual monomer in the composition is under 0.5 wt %.

| Component | Parts by weight |
|---|---|
| Castor oil | 320 |
| Softener (Levagard PP) | 370 |
| Solvent (propylene carbonate) | 60 |
| Flameproofing agent (Ixol M 125) | 170 |
| Tego IMR 830 (10%) (Cell regulator) | 50 |
| Stabilizer (Tegostab B 1048) | 30 |
| Catalysts | |
| Texacat DMDEE | 5 |
| Thancat DMP | 5 |
| Polyol component 4 | 1000 |
| Polyol component 4 | 110 g |
| Desmodur N 75 | 50 g |
| Desmodur N 3400 | 150 g |
| Propellant R 134a | 30 g |
| R 152a | 60 g |
| DME | 10 g |
| Crosslinker: Ethylene glycol | 13 g |
| Catalyst (Thancat AN 10, Fe-acetonylacetate) | 4 g |
| Total | 427 g |
| Gas fraction (wt %) | 27 |

EXAMPLES 5 AND 6

Inventive prepolymer compositions were produced by the following recipes analogously to Example 1. The compositions yield an insulating foam with good dimensional stability and good insulating properties. The content of residual monomer is under 0.5 wt %.

| Components | Example 5 | Example 6 |
|---|---|---|
| Polyol component ⅔ | 110 g | 110 g |
| Desmodur N 3400 | 100 g | 100 g |
| Desmodur DA | 100 g | 100 g |
| Propellant R 134 a | 30 g | 30 g |
| R 152a | 60 g | 60 g |
| DME | 10 g | 10 g |
| Crosslinker: Ethylene glycol | 13 g | 13 g |
| Catalyst | 4 g | 4 g |
| (Thancat AN 10, Dabco T-9) | | |
| Total | 427 g | 427 g |

EXAMPLES 7 AND 8

Inventive prepolymer compositions were produced by the following recipes analogously to Example 1. The compositions yield an insulating foam with good dimensional stability and good insulating properties. The content of residual monomer in the composition is under 0.5 wt %.

The composition contains an extending mineral for promoting dimensional stability in the form of talcum (Finntalc M-15) or calcium carbonate (Ultracarb U-5).

| Components | Example 7 | Example 8 |
|---|---|---|
| Castor oil | 320 | 320 |
| Softener | 325 | 325 |
| Flameproofing agent | 150 | 150 |
| Tego IMR 830 (10%) | 50 | 50 |
| Wetting additive (Byk 160) | 5 | 5 |
| Thixotroping agent (Aerosil 200) | 10 | 10 |
| Extending mineral | | |
| Finntalc M-15 | 100 | |
| Ultracarb U-5 | | 100 |
| Tegostab B 1048 | 30 | 30 |
| Texacat DMDEE | 5 | 5 |
| Thancat DMP | 5 | 5 |
| Polyol component ⅞ | 1000 | 1000 |
| Polyol component ⅞ | 142 g | 142 g |
| Desmodur N 3400 | 181 g | 181 g |
| Propellant R 134a | 30 g | 30 g |
| R 152a | 60 g | 60 g |
| DME | 10 g | 10 g |
| Crosslinker: Ethylene glycol | 12 g | 12 g |
| Catalyst | 5 g | 5 g |
| Total | 440 g | 440 g |
| NCO surplus (wt %) | 4.01 | 4.01 |

(Note, the designations "Desmodur", "Tego", "Aerosil", "Finntalc", "Ultraearl", "Tegostab", "Texacat", "Thancat", "Levagard", and "Ixol" are trademarks.)

What is claimed is:

1. A prepolymer composition for producing polyurethane insulating foams from pressure tanks, which composition comprises: a prepolymer component with at least one polyurethane (PU) prepolymer having a content of NCO groups of 4 to 20 wt % and additives, and a propellant component, wherein said at least one PU prepolymer comprises a polyisocyanate with a content of less than 2 wt %, based on the prepolymer component of monomeric polyisocyanate wherein said prepolymer composition comprises at least one polyurethane prepolymer made from tolylene diisocyanate (TDI)

wherein the PU prepolymer has an initial service viscosity at 20° C. of 5,000 to 20,000 mPa.s.

2. The prepolymer composition of claim 1, wherein the composition comprises a PU prepolymer based on tolylene diisocyanate (TDI) and polyetherols.

3. A prepolymer composition for producing polyurethane insulating foams from pressure tanks, which composition comprises: a prepolymer component with at least one polyurethane (PU) prepolymer having a content of NCO groups of 4 to 20 wt % and additives, and a propellant component, wherein said at least one PU prepolymer comprises a polyisocyanate with a content of less than 2 wt %, based on the prepolyiner component of monomeric polyisocyanate wherein said prepolymer composition comprises at least one polyurethane prepolymer selected from hexamethylene diisocyanate, naphthalene-1,5-diisocyanate, tolylene diisocyanate or isophorone diisocyanate, diphenylmethane diisocyanate, or combinations of these prepolymers; and wherein the prepolymer composition has a content of liquid polybutadiene of 0.02 to 1 wt %.

4. A prepolymer composition for producing polyurethane insulating foams from pressure tanks, which composition comprises: a prepolymer component with at least one polyurethane (PU) prepolymer having a content of NCO groups of 4 to 20 wt % and additives, and a propellant component, wherein said at least one PU prepolymer comprises a polyisocyanate with a content of less than 2 wt %, based on the prepolymer component of monomeric polyisocyanate wherein said prepolymer composition comprises at least one polyurethane prepolymer selected from hexamethylene diisocyanate, naphthalene-1,5-diisocyanate, tolylene diisocyanate or isophorone diisocyanate, diphenylmethane diisocyanate, or combinations of these prepolymers, wherein the prepolymer composition has a content of liquid polybutadiene of 0.02 to 1 wt %, and wherein the liquid polybutadiene contains about 75%, 1,4-cis doublebonds, about 24% 1,4-trans double bonds and about 1% vinyl double bonds, has a molecular weight, determined by vaporpressure osmosis, of about 3000 and a viscosity at 20° C. of about 3000 mPa.s.

5. The prepolymer composition of claim 3 further which contains a content of paraffin oil or defoamer of 0.01 to 2 wt %, based on the prepolymer component.

6. The prepolymer composition of claim 3 wherein the propellant content is 5 to 40 wt %.

7. The prepolymer composition of claim 3 wherein the propellant component contains propane, butane, dimethylether or mixtures thereof.

8. The prepolymer composition of claim 3 wherein the propellant component contains a fluorocarbon selected from the group consisting of pentafluoroethanol (R125) 1,1,1,2-tetrafluoroethane (R134a); 1,1,2-trifluoroethane (R143); 1,1-difluoroethane (R152a); and mixtures thereof.

9. The prepolymer composition of claim 3 wherein the prepolymer component has an initial service viscosity of the PU prepolymer at 20° C. of 5000 to 20000 mPa.s and the poylurethane (PU) prepolymer is tolylene diisocyanate.

10. The prepolymer composition of claim 9, characterized by an initial service viscosity of the PU prepolymer of 8000 to 15000 mPa.s.

11. The prepolymer composition of claim 1 wherein the composition has a content of paraffin oil or defoamer of 0.01 to 2 wt % based on the prepolymer content.

12. The prepolymer composition of claim 1 wherein the composition has a content of propellant of about 5 to 40 wt %.

13. The prepolymer composition of claim 1 wherein the propellant component is selected from the group consisting of propane, butane, dimethyl ether and mixtures thereof.

14. A prepolymer composition for producing polyurethane insulating foams from pressure tanks, which composition comprises:

a prepolymer component with at least one polyurethane (PU) prepolymer having a content of NCO groups of 4 to 20 wt % and additives, and a propellant component, wherein said at least one PU prepolymer comprises a polyisocyanate with a content of less than 2 wt %, based on the prepolymer component of monomeric polyisocyanate, wherein said prepolymer composition comprises at least one polyurethane prepolymer selected from the group consisting of hexamethylene diisocynate, tolylene diisocyanate, isophorone diisocyanate, and combinations of these prepolymers, wherein the composition comprises a polyurethane (PU) prepolymer of aliphatic or aromatic polyisocyanates and aliphatic or aromatic polyetherols, wherein the content of additive liquid polybutadiene is between about 0.02 and 1 wt %.

15. A prepolymer composition for producing polyurethane insulating foams from pressure tanks, which composition comprises: a prepolymer component with at least one polyurethane (PU) prepolymer having a content of NCO groups of 4 to 20 wt % and additives, and a propellant component, wherein said at least one PU prepolymer comprises a polyisocyanate with a content of less than 2 wt %, based on the prepolymer component of monomeric polyisocyanate, wherein said prepolymer composition comprises at least one polyurethane prepolymer made from tolylene diisocyanate wherein the content of additive liquid polybutadiene is between about 0.02 and 1 wt % said prepolymer characterized by an initial service viscosity of the PU prepolymer at 20° C. of 5000 to 20,000 mPa.

16. The prepolymer composition of claim 4 further contains a content of paraffin oil or defoamer of 0.01 to 2 wt %, based on the prepolymer component.

17. The prepolymer composition of claim 4 wherein the propellant content is 5 to 40 wt %.

18. The prepolymer composition of claim 4 wherein the propellant component contains propane, butane, dimethylether or mixtures thereof.

19. The prepolymer composition of claim 4 wherein the propellant component contains a fluorocarbon selected from the group consisting of pentafluoroethanol (R125) 1,1,1, 2-tetrafluoroethane (R134a); 1,1,2-trifluoroethane (R143); 1,1-difluoroethane (R152a); and mixtures thereof.

20. The prepolymer composition of claim 4 wherein the prepolymer component has an initial service viscosity of th PU prepolymer at 20° C. of 5000 to 20000 mPa.s.

21. The prepolymer composition of claim 20 wherein the prepolymer has an initial service viscosity of the PU prepolymer of 8000 to 15000 mPa.s.

* * * * *